United States Patent [19]

Kukes et al.

[11] Patent Number: 4,555,499
[45] Date of Patent: Nov. 26, 1985

[54] CATALYST FOR DEMETALLIZATION OF HYDROCARBON CONTAINING FEED STREAMS

[75] Inventors: Simon G. Kukes; James B. Kimble, both of Bartlesville, Okla.

[73] Assignee: Phillips Petroleum Company, Bartlesville, Okla.

[21] Appl. No.: 576,079

[22] Filed: Feb. 1, 1984

Related U.S. Application Data

[62] Division of Ser. No. 485,792, Apr. 18, 1983, abandoned.

[51] Int. Cl.⁴ ............................................. B01J 27/14
[52] U.S. Cl. ................................. 502/208; 502/209; 502/213
[58] Field of Search ....................... 502/208, 209, 213

[56] References Cited

U.S. PATENT DOCUMENTS

| | | | |
|---|---|---|---|
| 1,882,712 | 10/1933 | Andersson et al. | 502/208 X |
| 2,349,243 | 5/1944 | Bates | 502/208 X |
| 2,921,081 | 1/1960 | Zimmerschied et al. | 502/208 X |
| 3,130,147 | 3/1964 | Dwyer et al. | 502/208 X |
| 3,196,104 | 7/1965 | Gleim et al. | 208/264 |
| 3,320,331 | 5/1967 | Goopor et al. | 502/209 |
| 3,416,884 | 12/1968 | Styres et al. | 502/208 X |
| 3,493,517 | 2/1970 | Jaffe | 252/437 |
| 3,530,066 | 9/1970 | Kuwata et al. | 208/309 |
| 3,546,105 | 12/1970 | Jaffe | 208/216 |
| 3,577,353 | 5/1971 | White | 252/465 |
| 3,682,836 | 8/1972 | Jaffe | 252/437 |
| 3,684,688 | 1/1971 | Roselius | 208/50 |
| 3,733,327 | 5/1973 | Vrieland et al. | 502/208 X |
| 3,791,967 | 2/1974 | Jaffe | 208/216 |
| 3,830,731 | 3/1972 | Reed, Jr. et al. | 208/211 |
| 3,892,538 | 7/1975 | Seth | 23/295 |
| 3,897,365 | 7/1975 | Feins et al. | 252/435 |
| 3,926,845 | 12/1975 | Cichowski | 502/213 X |
| 3,946,079 | 3/1976 | Mizutani et al. | 502/208 X |
| 4,003,828 | 1/1977 | Eberly, Jr. | 208/251 H |
| 4,044,066 | 8/1977 | Ripley | 502/213 X |
| 4,059,679 | 11/1977 | Clearfield | 502/213 X |
| 4,118,588 | 10/1978 | Fouquet et al. | 502/208 X |
| 4,191,636 | 3/1980 | Fukui et al. | 208/110 |
| 4,292,202 | 9/1981 | Vartuli et al. | 502/209 |
| 4,324,908 | 8/1982 | Grosselli et al. | 502/208 X |
| 4,340,466 | 7/1982 | Inooka | 208/110 |
| 4,382,854 | 5/1983 | Wilson et al. | 502/213 X |
| 4,384,985 | 5/1983 | Grum et al. | 502/213 |
| 4,400,568 | 8/1983 | Hofmann et al. | 502/208 X |
| 4,427,575 | 1/1984 | Johnson et al. | 502/208 |
| 4,444,905 | 4/1984 | Pessemisis | 502/213 |
| 4,450,068 | 5/1984 | Kukes | 502/209 X |

*Primary Examiner*—D. E. Gantz
*Assistant Examiner*—William G. Wright
*Attorney, Agent, or Firm*—French and Doescher

[57] ABSTRACT

Metals contained in a hydrocarbon containing feed stream are removed by contacting the hydrocarbon containing feed stream under suitable demetallization conditions with hydrogen and a catalyst composition comprising zirconium phosphate, cobalt phosphate and a metal phosphate where the metal is selected from the group consisting of nickel and vanadium. Molybdenum phosphate may also be added to the catalyst composition if desired. The life and activity of the catalyst composition may be increased by introducing a decomposable metal compound selected from the group consisting of the metals of Group V-B, Group VI-B, Group VII-B and Group VIII of the Periodic Table into the hydrocarbon containing feed stream prior to contacting the hydrocarbon containing feed stream with the catalyst composition.

7 Claims, No Drawings

CATALYST FOR DEMETALLIZATION OF HYDROCARBON CONTAINING FEED STREAMS

This application is a division of application Ser. No. 485,792, filed Apr. 18, 1983, abandoned.

This invention relates to a process for removing metals from a hydrocarbon containing feed stream and a catalyst therefor.

It is well known that crude oil as well as products from extraction and/or liquifaction of coal and lignite, products from tar sands, products from shale oil and similar products may contain metals such as vanadium, nickel and iron. When these hydrocarbon containing feeds are fractionated, the metals tend to concentrate in the heavier fractions such as the topped crude and residuum. The presence of the metals make further processing of these heavier fractions difficult since the metals generally act as poisons for catalysts employed in processes such as catalytic cracking, hydrogenation or hydrodesulfurization.

It is thus an object of this invention to provide a process for removing metals from a hydrocarbon containing feed stream so as to improve the processability of such hydrocarbon containing feed stream and especially improve the processability of heavier fractions such as topped crude and residuum. It is also an object of this invention to provide a catalyst composition which is useful for demetallization.

In accordance with the present invention, a hydrocarbon containing feed stream, which also contains metals, is contacted with a catalyst composition comprising zirconium phosphate, cobalt phosphate and a metal phosphate where the metal is selected from the group consisting of nickel and vanadium in the presence of hydrogen under suitable demetallization conditions. Molybdenum phosphate may also be included in the catalyst composition if desired but is not preferred. It is believed that the metals contained in hetercyclic compounds such as porphyrines are removed from the heterocyclic compounds by the combination of heat, hydrogen and the catalyst composition of the present invention and are trapped in pores in the catalyst composition. Removal of the metals from the hydrocarbon containing feed stream in this manner provides for improved processability of the hydrocarbon containing feed stream in processes such as catalytic cracking, hydrogenation and hydrodesulfurization.

Other objects and advantages of the invention will be apparent from the foregoing brief description of the invention and the appended claims as well as the detailed description of the invention which follows.

Any metal which can be trapped in the pores of the catalyst composition of the present invention can be removed from a hydrocarbon containing feed stream in accordance with the present invention. The present invention is particularly applicable to the removal of vanadium and nickel.

Metals may be removed from any suitable hydrocarbon containing feed streams. Suitable hydrocarbon containing feed streams include petroleum products, coal pyrolyzates, products from extraction and/or liquifaction of coal and lignite, products from tar sands, products from shale oil and similar products. Suitable hydrocarbon feed streams include gas oil having a boiling range from about 205° C. to about 538° C., topped crude having a boiling range in excess of about 343° C. and residuum. However, the present invention is particularly directed to heavy feed streams such as heavy topped crudes and residuum and other materials which are generally regarded as being too heavy to be distilled. These materials will generally contain the highest concentrations of metals such as vanadium and nickel.

The demetallization catalyst employed in the process of the present invention is a composition comprising zirconium phosphate, cobalt phosphate and a metal phosphate where the metal is selected from the group consisting of nickel and vanadium. Also, molybdenum phosphate may be added if desired but is not preferred. As used herein, the term phosphate includes orthophosphates, pyrophosphates, metaphosphates and polyphosphates. Vanadium is preferred as the metal because the removal of metals increases to some extent when vanadium phosphate is used in the catalyst composition, especially at lower temperatures.

The catalyst composition can be prepared by any suitable method. Coprecipitation is preferred because it is believed that the catalyst composition is more effective when prepared by coprecipitation. The catalyst is generally prepared by coprecipitating any suitable zirconium salt, any suitable cobalt salt and any suitable salt of the metal selected from the group consisting of nickel and vanadium with any suitable phosphate. The coprecipitation may be carried out in any suitable solvent such as water or alcohol with water being the preferred solvent. The metal salts and the phosphate must be soluble in the solvent used to be suitable. If molybdenum is included in the catalyst composition, a suitable salt of molybdenum is also included in the coprecipitation.

If a phosphate such as diamonium phosphate is utilized, the pH of the solution will generally be such that precipitation will occur. However, if other phosphates are used, it may be necessary to add a base such as ammonia to achieve a pH which will result in the desired precipitation.

The precipitant formed is washed, dried and calcined in the presence of a free oxygen containing gas such as air to form the catalyst.

The drying of the precipitant may be accomplished at any suitable temperature. Generally a temperature of about 20° C. to about 200° C., preferably about 100° C. to about 150° C., is utilized for a time in the range of about 1 hr. to about 30 hrs.

The calcining step is utilized to remove traces of nitrates, traces of carbon, and water and to make the structure of the catalyst composition harder. Any suitable calcining temperature can be utilized. Generally, the calcining temperature will be in the range of about 300° C. to about 800° C. with a temperature in the range of about 500° C. to about 650° C. being preferred for a time in the range of about 1 to about 24 hours, preferably about 2 to about 6 hours.

The catalyst composition can have any suitable surface area and pore volume. In general, the surface area will be in the range of about 2 to about 400 m$^2$/g, preferably about 50 to about 150 m$^2$/g, while the pore volume will be in the range of about 0.2 to about 4.0 cc/g, preferably about 0.5 to about 2.0 cc/g.

Any suitable phosphates may be utilized to prepare the catalyst composition. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, rubidium, and cesium, and $H_3PO_4$. Phosphonic acids such as phenyl phosphonic acids and the metal salts of phosphonic acids may also be used to derive phosphates for the catalyst composition if desired.

Any suitable metal (including zirconium and cobalt) to phosphorus ratio in the catalyst composition may be used. The ratio will generally be about stoichiometric. Any suitable ratio of cobalt, the metal selected from the group consisting of nickel and vanadium and molybdenum, if used, to zirconium may be used. The molar ratio of zirconium to these metals will generally be in the range of about 10:1 to about 1:10 and more preferably in the range of about 3:1 to about 1:2.

The demetallization process of this invention can be carried out by means of any apparatus whereby there is achieved a contact of the catalyst composition with the hydrocarbon containing feed stream and hydrogen under suitable demetallization conditions. The process is in no way limited to the use of a particular apparatus. The process of this invention can be carried out using a fixed catalyst bed, fluidized catalyst bed or a moving catalyst bed. Presently preferred is a fixed catalyst bed.

The catalyst composition may be used alone in the reactor or may be used in combination with essentially inert materials such as alumina, silica, titania, magnesia, silicates, aluminates, alumina silicates, titanates and phosphates. A layer of the inert material and a layer of the catalyst composition may be used or the catalyst composition may be mixed with the inert material. Use of the inert material provides for better dispersion of the hydrocarbon containing feed stream. Also, other catalysts such as known hydrogenation and desulfurization catalysts may be used in the reactor to achieve simultaneous demetallization, desulfurization and hydrogenation or hydrocracking if desired.

Any suitable reaction time between the catalyst composition and the hydrocarbon containing feed stream may be utilized. In general, the reaction time will range from about 0.1 hours to about 10 hours. Preferably, the reaction time will range from about 0.4 to about 4 hours. Thus, the flow rate of the hydrocarbon containing feed stream should be such that the time required for the passage of the mixture through the reactor (residence time) will preferably be in the range of about 0.4 to about 4 hours. This generally requires a liquid hourly space velocity (LHSV) in the range of about 0.10 to about 10 cc of oil per cc of catalyst per hour, preferably from about 0.2 to about 2.5 cc/cc/hr.

The demetallization process of the present invention can be carried out at any suitable temperature. The temperature will generally be in the range of about 150° to about 550° C. and will preferably be in the range of about 350° to about 450° C. Higher temperatures do improve the removal of metals but temperatures should not be utilized which will have adverse effects on the hydrocarbon containing feed stream, such as coking, and also economic considerations must be taken into account. Lower temperatures can generally be used for lighter feeds.

Any suitable pressure may be utilized in the demetallization process. The reaction pressure will generally be in the range of about atmospheric to about 5,000 psig. Preferably, the pressure will be in the range of about 100 to about 2500 psig. Higher pressures tend to reduce coke formation but operation at high pressure may have adverse economic consequences.

Any suitable quantity of hydrogen can be added to the demetallization process. The quantity of hydrogen used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized for demetallization until a satisfactory level of metals removal fails to be achieved which is believed to result from the coating of the catalyst composition with the metals being removed. It is possible to remove the metals from the catalyst composition by certain leaching procedures but these procedures are expensive and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition may be used for a period of time long enough to accumulate 20–200 wt.% of metals, mostly Ni and V, based on the weight of the catalyst composition, from oils.

It is believed that the life of the catalyst composition and the efficiency of the demetallization process can be improved by introducing a decomposable metal compound into the hydrocarbon containing feed stream. It is believed that the metal in the decomposable metal compound could be selected from the group consisting of the metals of Group V-B, Group VI-B, Group VII-B and Group VIII of the Periodic Table. Preferred metals are molybdenum, tungsten, manganese, chromium, nickel and iron. Molybdenum is a particularly preferred metal which may be introduced as a carbonyl, acetate, acetalacetate, octoate, or naphthenate. Molybdenum hexacarbonyl is a particularly preferred additive.

Any suitable concentration of the additive may be added to the hydrocarbon containing feed stream. In general, a sufficient quantity of the additive will be added to the hydrocarbon containing feed stream to result in a concentration of the metal in the range of about 1 to about 1000 parts per million and more preferably in the range of about 5 to about 100 parts per million.

The following examples are presented in further illustration of the invention.

EXAMPLE I

In this example the preparation and pertinent properties of various phosphates employed as heavy oil demetallization catalysts are described.

Control Catalysts $Ni_3(PO_4)_2$ was prepared by first dissolving 290.8 grams (1.0 mole) of $Ni(NO_3)_2.6H_2O$ in 600 cc of hot water (about 70° C.) and then adding to this solution, with stirring, a solution of 198 grams of $(NH_4)_2HPO_4$ in 600 cc of hot water. The resulting solution was filtered to obtain the nickel phosphate precipitate. The precipitate was washed, dried in an oven overnight at a temperature of about 120° C., and then calcined in air at about 560° C. for 4 hours. The surface area (determined by BET method using $N_2$ gas) of $Ni_3(PO_4)$ was 7.6 $m^2$/gram. The pore volume (determined by mercury porosimetry in accordance with the procedure described by American Instrument Company, Silver Springs, Md., catalog number 5-7125-B) was 0.697 cc/gram.

$Zr_3(PO_4)_4$ was prepared by first dissolving 301 grams of zirconyl nitrate, $ZrO(NO_3)_2$, in 1 liter of hot water and then adding to this solution, with stirring, a solution of 151 grams of $(NH_4)_2HPO_4$ in 400 cc of hot water. The resulting solution was filtered to obtain the zirconium phosphate precipitate. The precipitate was washed with 2 liters of water, dried at about 120° C. overnight, and calcined in air at 550° C. for 5 hours. The calcined $Zr_3(PO_4)_4$ had a surface area of 64.9 m$^2$/gram, a pore volume of 0.76 cc/gram, a bound Zr content of 43.5 weight-%, a bound P content of 15.9 weight-%, a bound O content of 42.3 weight-%, and was essentially amorphous as indicated by X-ray diffraction measurement.

A mixed nickel phosphate-zirconium phosphate was prepared by first dissolving 58 grams of nickel nitrate and 93 grams of zirconyl nitrate in 1 liter of hot water and then adding to this solution a solution of 100 grams of $(NH_4)_2HPO_4$ in 400 cc of hot water. After mixing of the two solutions, 20 grams of $(NH_4)_2HPO_4$ in 100 cc of water was added. The mixture of the solutions was filtered to obtain the precipitate. The precipitate was washed with hot water, dried for about 30 hours at 120° C. and calcined in air at 600° C. for about 4 hours. The calcined $Ni_3(PO_4)_2$—$Zr_3(PO_4)_4$ had a surface area of 99.9 m$^2$/gram, a pore volume of 1.04 cc/gram, a bound Zr content of 29.0 weight-%, a bound Ni content of 12.0 weight-%, a bound P content of 35.7 weight-% and a bound O content of 35.7 weight-%. This catalyst was employed in runs 8, 21, 41 and 42.

An alternative method of preparing mixed nickel phosphate-zirconium phosphate employed the less expensive zirconyl chloride as a starting material. 233 grams (1.0 mole) of $ZrOCl_2.4H_2O$ and 292 grams (1.0 mole) of $Ni(NO_3)_2.6H_2O$ were dissolved in 2.0 liters of hot water. A solution of 300 grams of $(NH_4)_2HPO_4$ in 1.0 liter of warm water was added to the first solution (containing zirconyl chloride and nickel nitrate) with stirring for 20 minutes. The resulting mixture was filtered to obtain the precipitate. The nickel phosphate-zirconium phosphate filter cake was washed with 2 liters of warm water. The washed nickel phosphate-zirconium phosphate was dried for 16 hours and calcined in air at 550°–580° C. for 24 hours. Its surface area was 62.3 m$^2$/grams, its pore volume (determined by mercury porosimetry) was 1.05 cc/gram, and the volume of pores having a diameter smaller than 300 Å (calculated from BET nitrogen adsorption) was 0.18 cc/gram. This catalyst was employed in runs 4, 19, 31, 43 and 51.

Several additional nickel phosphate-zirconium phosphate catalysts were prepared from $ZrOCl_2.4H_2O$ essentially in accordance with the above-described procedure with the exception that the Ni:Zr ratio was varied. One nickel phosphate-zirconium phosphate catalyst, which had a bound Ni-content of 7.3 weight %, a surface area of 52 m$^2$/gram and a pore volume of 0.63 cc/gram, was employed in runs 5, 6, 32, 44 and 52. Another nickel phosphate-zriconium phosphate catalyst, which had a bound Ni-content of 4.0 weight %, a surface zrea of 64 m$^2$/gram and a pore volume of 0.64 cc/gram, was employed in runs 7, 20 and 53.

A mixed iron phosphate-zirconium phosphate was prepared by disolving 43 grams of $Fe(NO_3)_3$ and 95 grams of $ZrO(NO_3)_2$ in 1 liter of hot water, filtering, then adding to the filtrate 100 grams of $(NH_4)_2HPO_4$ dissolved in 500 cc of water, mixing the two solutions and filtering to obtain the precipitate. The precipitate was washed twice with about 2 liters of hot water, dried overnight at about 120° C., and calcines in air at 550° C. for 4 hours. The surface area of the $FePO_4$—$Zr_3(PO_4)_4$ catalyst was 69.5 m$^2$/gram, its pore volume was 0.87 cc/gram, its bound Fe content was 6.8 weight-%, its bound Zr content was 27 weight-%, its bound P content was 19.9 weight-%, and its bound O content was 43.7 weight-%.

A mixed vanadium phophsate-zirconium phosphate was prepared by first dissolving 40 grams of vanadyl sulfate and 93 grams of $ZrO(NO_3)_2$ dissolved in 1 liter of hot water and then adding to this solution 100 grams of $(NH_4)_2HPO_4$ dissolved in 500 cc of hot water. The mixture of the two solutions was filtered to obtain the precipitate. The precipitate was washed twice with 1 liter of hot water, dried at 120° C. for several hours, and calcined at 550° C. for 4 hours. The calcined $V_3(PO_4)_5$—$Zr_3(PO_4)_4$ had a surface area of 12.5 m$^2$/gram, a pore volume of 1.1 cc/gram, a bound V content of 9.6 weight-%, a bound Zr content of 30 weight-%, a bound P content of 15.6 weight-%, and a bound O content of 36.8 weight-%.

A mixed cobalt phosphate-zirconium phosphate was prepared by first dissolving 54 grams of $Co(NO_3)_2.6H_2O$ and 130 grams of $ZrOCl_2.4H_2O$ in 600 cc of deionized water at 57° C. with stirring and then adding to this solution 130 grams of $(NH_4)_2HPO_4$ dissolved in 500 cc of hot water. The resulting mixture was stirred for 2 hours at 59°–71° C. The mixture was then filtered to obtain the cobalt phosphate-zirconium phosphate precipitate. The precipitate was slurried with 1 liter of water at 48° C., filtered, dried and calcined for 4 hours at 550° C. The pore volume of the dried cobalt phosphate-zirconium phosphate was 1.29 cc/gram, and a surface area of 25.7 m$^2$/gram.

A mixed vanadium phosphate-iron phosphate-zirconium phosphate catalyst was prepared as follows: 80.0 grams of $VOSO_4.4H_2O$, 80.3 grams of $FeSO_4$ and 100.0 grams of $ZrOCl_24H_2O$ were dissolved in 1 liter of water at 50° C. with stirring for 30 minutes, at a pH of 1. To this solution (temperature: 70° C.) a second solution (temperature: 60° C.) containing 152 grams of $(NH_4)_2HPO_4$ in 600 ml of water was added with stirring. The mixture of the two solutions (pH=3.5) was stirred on a hot plate, at about 100° C., for about 1 hour, until a grey gel was formed by precipitation. Then enough ammonia was added to adjust the pH to 6.9. No additional precipitation was observed. After stirring for 15 more minutes, the precipitate was filtered, washed with 1.5 liters of warm water, dried overnight at about 120° C., and calcined at 500° C. for 4 hours. The surface area of this vanadium phosphate-iron phosphate-zirconium phosphate was 20 m$^2$/g. The pore volume was 1.04 cc/g.

Inventive Catalysts

A mixed vanadium phosphate-cobalt phosphate-zirconium phosphate catalyst was prepared as follows: 21 grams (0.11 moles) of vanadyl sulfate, 36 grams (0.12 moles) of cobalt nitrate and 87 grams 0.345 moles) of $ZrCl_2.4H_2O$ were dissolved in 600 ml of hot water with stirring for about 10 minutes. To this dark blue solution a second solution, containing 100 grams of $(NH_4)_2HPO_4$ in 400 ml of water, was added. The mixture of the two solutions was stirred for 2 hours while kept hot. After 25 hours, the precipitate was filtered and washed with 1.5 liters of warm water. Then the mixed phosphate catalyst was transferred to a beaker with 12 liter of hot water, stirred for about 30 minutes, filtered, dired in an oven overnight at about 120° C., and finally calcined at about 550° C. for 4 hours. The surface area of this catalyst was 64.0 m²/gram; its pore volume was 0.873 cc/gram.

A mixed Mo phosphate-V phosphate-Co phosphate-Zr phosphate catalyst was prepared as follows: 35 grams of ammonium molybdate (containing about 0.2 g-atoms of Mo), 21 grams (0.11 moles) of vanadyl sulfate, 37.5 grams (0.125 moles) of cobalt nitrate, and 89 grams (0.35 moles) of $ZrOCl_2.4H_2O$ were added to 600 ml of water. The mixture was heated on a hot plate for 2 hours. Some undissolved material remained in solution. To this opaque, yellow solution a second solution comprising 130 grams of $(NH_4)_2HPO_4$ in 600 ml of water was added. The mixture of the two solutions turned blue, but no precipitate formed. However, after stirring for 10 minutes on a hot plate a gray-blue gel-like precipitate formed. After continued stirring for 2.5 hours, the precipitate was filtered, washed with 1.5 liters of hot water, and calcined at 550° C. for 4 hours. The surface area of this mixed phosphate catalyst was 38 m²/gram; its pore volume was 2.32 cc/gram.

A mixed nickel phosphate-cobalt phosphate-zirconium phosphate catalyst was prepared as follows: 33 grams (0.125 moles) of $NiNO_3.6H_2O$, 37 grams of (0.115 moles) $Co(NO_3)_2.6H_2O$ and 88.5 grams (0.35 moles) of $ZrOO_2.4H_2P$ were dissolved in 660 ml of warm water. To this solution a second solution, containing 106 grams of $(NH_4)_2HPO_4$ in 400 ml of water, was added. After stirring this mixture for 2.5 hours on a hot plate, the formed percipitate was filtered, washed with 1.5 liters of hot water, dried, and calcined at about 550° C. for 4 hours. The surface area of this catalyst was 49.6 m²/g; its pore volume was 0.73 cc/g.

EXAMPLE II

This example illustrates the experimental setup for investigating the demetallization of heavy oils by employing various phosphate catalyst. Oil, with or without a dissolved decomposable molybdenum compound, was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 O.D. axial thermocouple well. The reactor was filled with a top layer (3.5 inches below the oil/H₂ feed inlet) of 50 cc of low surface area (less than 1 m²/gram) α-alumina, a middle layer of 50 cc of a phosphate catalyst, and a bottom layer of 50 cc of α-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well. The liquid product was collected in a receiver flask, filtered through a glass frit and analyzed, whereas exiting hydrogen gas was vented. Vanadium and nickel content in oil was determined by plasma emission analysis.

The feed was a mixture of 26 weight-% toluene and 74 weight-% Venezuelan Monagas pipeline oil having an API gravity of about 17-18. The hydrogen pressure was maintained at about 1000 psig in all experiments which generally lasted from about 2-6 hours. The reactor temperature (average of thermocouple readings at four reactor locations) was about 375°-435° C. The liquid hourly space velocity (LHSV) of the feed ranged from about 0.5 cc/cc catalyst/hour to about 2 cc/cc catalyst/hour.

EXAMPLE III

Results of heavy oil demetallization runs at 425° C. employing various mixed phosphate catalyst in accordance with the procedure described in Example II are summarized in Table I.

TABLE I

| Run | LHSV (c/cc/hr) | Catalyst | Pore Volume (cc/g) | Run Time (Hours) | Feed Vanadium (ppm) | Nickel (ppm) | Total (V + Ni) (ppm) |
|---|---|---|---|---|---|---|---|
| 1 (Control) | 0.99 | Zr—PO₄ | 0.76 | 3.0 | 269 | 62.6 | 331.6 |
| 2 (Control) | 0.96 | Zr—PO₄ | 0.76 | 4.0 | 217 | 39.2 | 256.2 |
| 3 (Control) | 0.93 | Ni—PO₄ | 0.70 | 6.0 | 277 | 73.6 | 350.6 |
| 4 (Control) | 0.95 | Ni—Zr—PO₄ | 1.05 | 2.8 | 220 | 65 | 285 |
| 5 (Control) | 0.89 | Ni—Zr—PO₄ | 0.63 | 6.0 | 220 | 65 | 285 |
| 6 (Control) | 0.93 | Ni—Zr—PO₄ | 0.63 | 3.0 | 220 | 65 | 285 |
| 7 (Control) | 0.92 | Ni—Zr—PO₄ | 0.64 | 3.8 | 220 | 65 | 285 |
| 8 (Control) | 0.90 | Ni—Zr—PO₄ | 1.04 | 5.0 | 225 | 58.3 | 283.3 |
| 9 (Control) | 0.97 | Fe—Zr—PP₄ | 0.87 | 3.0 | 225 | 58.3 | 283.3 |
| 10 (Control) | 0.97 | Co—Zr—PO₄ | 1.29 | 3.0 | 242.8 | 53.3 | 296.1 |
| 11 (Control) | 1.02 | V—Zr—PO₄ | 1.1 | 6.5 | 225 | 58.3 | 283.3 |
| 12 (Control) | 0.95 | V—Fe—Zr—PO₄ | 1.04 | 3.0 | 293 | 67.8 | 360.8 |
| 13 (Invention) | 0.93 | V—Co—Zr—PO₄ | 0.87 | 3.0 | 281 | 42.9 | 323.9 |
| 14 (Invention) | 0.98 | Mo—V—Co—Zr—PO₄ | 2.32 | 3.0 | 281 | 42.9 | 323.9 |
| 15 (Invention) | 0.95 | Ni—Co—Zr—PO₄ | 0.73 | 3.0 | 315 | 68.0 | 383.0 |
| 16 (Control) | 1.60 | Zr—PO₄ | 0.76 | 2.5 | 269 | 62.6 | 331.6 |
| 17 (Control) | 1.53 | Zr—PO₄ | 0.76 | 2.1 | 217 | 39.2 | 256.2 |
| 18 (Control) | 1.46 | Ni—PO₄ | 0.70 | 5.0 | 277 | 73.6 | 350.6 |
| 19 (Control) | 1.45 | Ni—Zr—PO₄ | 1.05 | 2.0 | 220 | 65 | 285 |
| 20 (Control) | 1.50 | Ni—Zr—PO₄ | 0.64 | 2.0 | 220 | 65 | 285 |
| 21 (Control) | 1.46 | Ni—Zr—PO₄ | 1.04 | 2.5 | 225 | 58.3 | 283.3 |
| 22 (Control) | 1.52 | Fe—Zr—PO₄ | 0.87 | 2.0 | 225 | 58.3 | 283.3 |
| 23 (Control) | 1.47 | Co—Zr—PO₄ | 1.29 | 2.5 | 242.8 | 53.3 | 296.1 |
| 24 (Control) | 1.51 | V—Zr—PO₄ | 1.1 | 2.0 | 225 | 58.3 | 283.3 |
| 25 (Control) | 1.46 | V—Zr—PO₄ | 1.1 | 6.0 | 225 | 58.3 | 283.3 |
| 26 (Control) | 1.59 | V—Fe—Zr—PO₄ | 1.04 | 2.5 | 293 | 67.8 | 360.8 |
| 27 (Invention) | 1.52 | V—Co—Zr—PO₄ | 0.87 | 2.5 | 281 | 42.9 | 323.9 |
| 28 (Invention) | 1.56 | Mo—V—Co—Zr—PO₄ | 2.32 | 2.5 | 281 | 42.9 | 323.9 |
| 29 (Invention) | 1.59 | Ni—Co—Zr—PO₄ | 0.73 | 2.5 | 315 | 68.0 | 383 |

Product     Removal

TABLE I-continued

| Run | Vanadium (ppm) | Nickel (ppm) | Total (V + Ni) (ppm) | of Metals (%) |
|---|---|---|---|---|
| 1 (Control) | 81.8 | 27.0 | 109.8 | 77 |
| 2 (Control) | 74.1 | 19.4 | 93.5 | 64 |
| 3 (Control) | 53.1 | 25.4 | 78.5 | 78 |
| 4 (Control) | 42.4 | 27.0 | 69.4 | 76 |
| 5 (Control) | 92.8 | 37.7 | 130.5 | 54[1] |
| 6 (Control) | 5.6 | 6.8 | 12.4 | 96 |
| 7 (Control) | 3.1 | 5.4 | 8.5 | 97 |
| 8 (Control) | 9.4 | 10.8 | 20.2 | 93 |
| 9 (Control) | 72.9 | 16.0 | 88.9 | 69 |
| 10 (Control) | 29.3 | 17.6 | 46.9 | 84 |
| 11 (Control) | 37.8 | 19.6 | 57.4 | 80 |
| 12 (Control) | 89.4 | 22.5 | 111.9 | 69 |
| 13 (Invention) | 17.6 | 6.9 | 24.5 | 92 |
| 14 (Invention) | 32.7 | 16.2 | 48.9 | 85 |
| 15 (Invention) | 20.3 | 15.1 | 35.4 | 91 |
| 16 (Control) | 148.0 | 42.7 | 190.7 | 42 |
| 17 (Control) | 113.0 | 27.1 | 140.1 | 45 |
| 18 (Control) | 160.0 | 61.6 | 221.6 | 37 |
| 19 (Control) | 8.1 | 8.3 | 16.4 | 94 |
| 20 (Control) | 30.9 | 21.7 | 52.6 | 82 |
| 21 (Control) | 6.2 | 11.1 | 17.3 | 94 |
| 22 (Control) | 95.8 | 22.7 | 118.5 | 58 |
| 23 (Control) | 94.3 | 32.8 | 126.1 | 57 |
| 24 (Control) | 87.3 | 29.8 | 117.1 | 59 |
| 25 (Control) | 193 | 56.3 | 249.3 | 12[2] |
| 26 (Control) | 177 | 39.8 | 216.8 | 40 |
| 27 (Invention) | 26.7 | 11.1 | 37.8 | 88 |
| 28 (Invention) | 58.6 | 25.2 | 83.8 | 74 |
| 29 (Invention) | 19.2 | 15.9 | 35.1 | 91 |

[1] Believed to be erroneous result; either temperature was not 425° C. or metal analysis was wrong
[2] Catalyst was used for about 40 hours in previous runs and was probably deactivated, or heavies containing most metals may have accumulated in the reactor causing the excessively high metals content in the product.

Data in Table I show that at 425° C. the mixed V—Co—Zr phosphate, optionally containing also Mo phosphate, and the mixed Ni—Co—Zr phosphate consistently were more effective in removing nickel and vanadium from the oil than the simple phosphates (phosphates of V, Co, Ni, Zr), as well as binary mixed phosphates (V—Zr phosphate, Co—Zr phosphates and Ni—Zr phosphate). On the other hand, surprisingly, V—Fe—Zr phosphate was not a more effective demetallizing catalyst than the simple phosphates of Fe, V and Zr or the mixed phosphates (Fe—Zr phosphate, V—Zr phosphate).

EXAMPLE IV

Results of the demetallization of heavy oils at 400° C. with various mixed phosphate catalyst in accordance with the procedure described in Example II are summarized in Table II.

TABLE II

| Run | LHSV (c/cc/hr) | Catalyst | Pore Volume (cc/g) | Run Time (Hours) | Feed Vanadium (ppm) | Nickel (ppm) | Total (V + Ni) (ppm) |
|---|---|---|---|---|---|---|---|
| 30 (Control) | 0.60 | Ni—PO$_4$ | 0.70 | 7 | 277 | 73.6 | 350.6 |
| 31 (Control) | 0.46 | Ni—Zr—PO$_4$ | 1.05 | 6 | 220 | 65 | 285 |
| 32 (Control) | 0.41 | Ni—Zr—PO$_4$ | 0.63 | 7.4 | 220 | 65 | 285 |
| 33 (Control) | 0.44 | Fe—Zr—PO$_4$ | 0.87 | 6.5 | 225 | 58.3 | 283.3 |
| 34 (Control) | 0.47 | V—Zr—PO$_4$ | 1.1 | 6.5 | 225 | 58.3 | 283.3 |
| 35 (Control) | 0.47 | Co—Zr—PO$_4$ | 1.29 | 6.5 | 242.8 | 53.3 | 296.1 |
| 36 (Control) | 0.44 | V—Fe—Zr—PO$_4$ | 1.04 | 6.0 | 293 | 67.8 | 360.8 |
| 37 (Invention) | 0.46 | V—Co—Zr—PO$_4$ | 0.87 | 6.5 | 281 | 42.9 | 323.9 |
| 38 (Invention) | 0.46 | Mo—V—Co—Zr—PO$_4$ | 2.32 | 6.5 | 281 | 42.9 | 323.9 |
| 39 (Invention) | 0.43 | Ni—Co—Zr—PO$_4$ | 0.73 | 6.0 | 315 | 68.0 | 383.0 |
| 40 (Control) | 1.02 | Ni—PO$_4$ | 0.70 | 7 | 277 | 73.6 | 350.6 |
| 41 (Control) | 0.98 | Ni—Zr—PO$_4$ | 1.04 | 6 | 225 | 58.3 | 283.3 |
| 42 (Control) | 0.84 | Ni—Zr—PO$_4$ | 1.04 | 4 | 225 | 58.3 | 283.3 |
| 43 (Control) | 0.92 | Ni—Zr—PO$_4$ | 1.05 | 3 | 220 | 65 | 285 |
| 44 (Control) | 0.90 | Ni—Zr—PO$_4$ | 0.63 | 4 | 220 | 65 | 285 |
| 45 (Control) | 0.97 | Fe—Zr—PO$_4$ | 0.87 | 3 | 225 | 58.3 | 283.3 |
| 46 (Control) | 1.01 | V—Zr—PO$_4$ | 1.1 | 3 | 225 | 58.3 | 283.3 |
| 47 (Control) | 0.94 | Co—Zr—PO$_4$ | 1.29 | 3 | 242.8 | 53.3 | 296.1 |
| 48 (Invention) | 0.93 | V—Co—Zr—PO$_4$ | 0.86 | 3 | 281 | 42.9 | 323.9 |
| 49 (Invention) | 0.95 | Mo—V—Co—Zr—PO$_4$ | 2.32 | 3 | 281 | 42.9 | 323.9 |
| 50 (Invention) | 0.93 | Ni—Co—Zr—PO$_4$ | 0.73 | 3 | 315 | 68.0 | 383.0 |
| 51 (Control) | 1.45 | Ni—Zr—PO$_4$ | 1.05 | 2 | 220 | 65 | 285 |
| 52 (Control) | 1.54 | Ni—Zr—PO$_4$ | 0.63 | 2 | 220 | 65 | 285 |
| 53 (Control) | 1.48 | Ni—Zr—PO$_4$ | 0.64 | 2 | 220 | 65 | 285 |
| 54 (Control) | 1.53 | Fe—Zr—PO$_4$ | 0.87 | 2 | 225 | 58.3 | 283.3 |
| 55 (Control) | 1.57 | V—Zr—PO$_4$ | 1.1 | 2 | 225 | 58.3 | 283.3 |
| 56 (Control) | 1.49 | Co—Zr—PO$_4$ | 1.29 | 2 | 242.8 | 53.3 | 296.1 |
| 57 (Control) | 1.52 | V—Fe—Zr—PO$_4$ | 1.04 | 2 | 293 | 67.8 | 360.8 |
| 58 (Invention) | 1.51 | V—Co—Zr—PO$_4$ | 0.87 | 2 | 281 | 42.9 | 323.9 |

TABLE II-continued

| | | | | | | | |
|---|---|---|---|---|---|---|---|
| 59 (Invention) | 1.53 | Mo—V—Co—Zr—PO4 | 2.32 | 2 | 281 | 42.9 | 323.9 |
| 60 (Invention) | 1.56 | Ni—Co—Zr—PO4 | 0.73 | 2 | 315 | 68.0 | 383.0 |

| Run | Vanadium (ppm) | Nickel (ppm) | Total (V + Ni) (ppm) | Removal of (V + Ni) (%) |
|---|---|---|---|---|
| 30 (Control) | 202 | 60.1 | 262.1 | 25 |
| 31 (Control) | 120 | 35.4 | 155.4 | 45 |
| 32 (Control) | 60.1 | 77.2 | 137.2 | 52 |
| 33 (Control) | 193 | 31.6 | 224.6 | 21 |
| 34 (Control) | 80.6 | 31.5 | 112.1 | 60 |
| 35 (Control) | 79.3 | 30.8 | 110.1 | 63 |
| 36 (Control) | 138 | 40.3 | 178.3 | 51 |
| 37 (Invention) | 39.6 | 11.7 | 51.3 | 84 |
| 38 (Invention) | 67.2 | 25.0 | 92.2 | 72 |
| 39 (Invention) | 53.4 | 22.6 | 76.0 | 80 |
| 40 (Control) | 233 | 65.2 | 298.2 | 15 |
| 41 (Control) | 74.2 | 37.5 | 111.7 | 61 |
| 42 (Control) | 96.4 | 38.3 | 134.7 | 52 |
| 43 (Control) | 216 | 63.9 | 279.9 | 10[1] |
| 44 (Control) | 100.4 | 81.3 | 181.7 | 36 |
| 45 (Control) | 222.0 | 35.5 | 257.5 | 9 |
| 46 (Control) | 180.0 | 49.6 | 229.6 | 19 |
| 47 (Control) | 162.8 | 45.0 | 207.8 | 30 |
| 48 (Invention) | 79.5 | 20.8 | 100.3 | 69 |
| 49 (Invention) | 120.9 | 33.1 | 153.0 | 53 |
| 50 (Invention) | 181 | 56.4 | 237.4 | 38 |
| 51 (Control) | 206 | 59.2 | 265.2 | 7[1] |
| 52 (Control) | 109.3 | 73.4 | 182.7 | 36 |
| 53 (Control) | 139.0 | 50.6 | 189.6 | 34 |
| 54 (Control) | 219.0 | 38.2 | 257.2 | 11 |
| 55 (Control) | 182.0 | 53.1 | 235.1 | 17 |
| 56 (Control) | 140.7 | 37.0 | 177.7 | 40 |
| 57 (Control) | 239 | 60.6 | 299.6 | 17 |
| 58 (Invention) | 119 | 16.9 | 135.9 | 58 |
| 59 (Invention) | 171 | 48.2 | 219.2 | 32 |
| 60 (Invention) | 160 | 44.5 | 204.5 | 47 |

[1]Believed to be erroneous results; either recorded temperature or metal analysis was wrong.

Data in Table II show that, at 400° C., the mixed V—Co—Zr phosphate, optionally containing also Mo phosphate, and the mixed Ni—Co—Zr phosphate were more effective demetallizing catalysts than the binary mixed phosphates. The mixed V—Fe—Zr phosphate was generally less effective than either V—Zr phosphate or Fe—Zr phosphate.

EXAMPLE V

In this example, the results of extended demetallization runs of up to 3 months in an automated reactor similar to the one described in Example II are described. Undiluted, heavy Monagas pipeline oil was used as the feed. It contained 88 ppm of Ni, 337 ppm of V, 2.73 weight-% S, 73.7 volume-% residual oil (boiling point higher than 650° F.), 24.7 volume-% of distillate (boiling range of 400°-650° F.); and it had an API gravity of 12.3°.

In all demetallization runs, the reactor temperature was 407° C. (765° F.), the oil feed LHSV was 0.9-1.1 cc/cc catalyst/hr, the total pressure was 2250 psig, and the hydrogen feed rate was 4800 SCF/bbl (standard cubic feed of $H_2$ per barrel of oil). Run 61 demonstrates the metal removal achieved with nickel-zirconium phosphate. Run 62 demonstrates the effect of adding $Mo(CO)_6$ as an additional demetallization agent to the feed oil. Results are summarized in Table III.

TABLE III

| Run | Mo in Feed (ppm) | Catalyst | Hours on Stream | Metals in Product (ppm) V | Ni | V + Ni | Removal of V + Ni (%) |
|---|---|---|---|---|---|---|---|
| 61 | 0 | Ni—Zr—PO4 | 117 | 93 | 49 | 142 | 66 |
| | 0 | Ni—Zr—PO4 | 233 | 114 | 55 | 169 | 60 |
| | 0 | Ni—Zr—PO4 | 257 | 109 | 54 | 163 | 61 |
| | 0 | Ni—Zr—PO4 | 303 | 104 | 51 | 155 | 63 |
| | 0 | Ni—Zr—PO4 | 390 | 118 | 50 | 168 | 60 |
| | 0 | Ni—Zr—PO4 | 436 | 108 | 45 | 153 | 64 |
| | 0 | Ni—Zr—PO4 | 532 | 109 | 49 | 158 | 63 |
| | 0 | Ni—Zr—PO4 | 789 | 89 | 47 | 136 | 68 |
| | 0 | Ni—Zr—PO4 | 1008 | 118 | 42 | 160 | 62 |
| | 0 | Ni—Zr—PO4 | 1228 | 108 | 46 | 154 | 64 |
| | 0 | Ni—Zr—PO4 | 1416 | 110 | 42 | 152 | 64 |
| | 0 | Ni—Zr—PO4 | 1717 | 135 | 48 | 183 | 57 |
| | 0 | Ni—Zr—PO4 | 2189 | 135 | 49 | 184 | 57 |
| 62 | 70 | Ni—Zr—PO4 | 124 | 90 | 40 | 130 | 69 |
| | 70 | Ni—Zr—PO4 | 220 | 92 | 42 | 134 | 68 |
| | 70 | Ni—Zr—PO4 | 244 | 68 | 36 | 104 | 75 |
| | 70 | Ni—Zr—PO4 | 327 | 78 | 38 | 116 | 73 |
| | 70 | Ni—Zr—Po4 | 375 | 81 | 37 | 118 | 72 |
| | 70 | Ni—Zr—PO4 | 423 | 74 | 36 | 110 | 74 |
| | 70 | Ni—Zr—PO4 | 471 | 68 | 35 | 103 | 76 |

TABLE III-continued

| | Mo in Feed | | Hours | Metals in Product (ppm) | | | Removal of V + Ni |
|---|---|---|---|---|---|---|---|
| Run | (ppm) | Catalyst | on Stream | V | Ni | V + Ni | (%) |
| | 70 | Ni—Zr—PO$_4$ | 495 | 64 | 34 | 98 | 77 |

Data in Table III show that, in run 62, which employed a feed oil containing about 70 ppm of Mo (as dissolved Mo(CO)$_6$), the demetallization activity of the nickel phosphate-zirconium phosphate had actually increased about 10% after almost 500 hours (3 weeks) on stream. The removal of V and Ni was consistently higher, especially after about 200 hours on-stream, than the system without Mo(CO)$_6$ (Run 61). Substantially all iron (approximately 56 ppm in oil) and other metals (manganese, copper, potassium, sodium) were also removed with nickel phosphate-zirconium phosphate with and without added Mo(CO)$_6$. Based on these results, it is believed that the addition of Mo to the feedstream would also be beneficial when using the inventive catalyst of the present invention.

That which is claimed is:

1. A catalyst composition comprising zirconium phosphate, cobalt phosphate and vanadium phosphate.

2. A composition in accordance with claim 1 wherein said catalyt composition is a coprecipitated vanadium phosphate, cobalt phosphate and zirconium phosphate.

3. A composition in accordance with claim 1 wherein said catalyst composition has a surface area in the range of about 2 to about 400 m$^2$/gram and has a pore volume in the range of about 0.2 to about 4.0 cc/gram.

4. A composition in accordance with claim 3 wherein said catalyst composition has a surface area in the range of about 50 to about 150 m$^2$/gram and has a pore volume in the range of about 0.5 to about 2.0 cc/gram.

5. A composition in accordance with claim 1 wherein the molar ratio of said zirconium to the combination of said cobalt and said vanadium is in the range of about 10:1 to bout 1:10.

6. A composition in accordance with claim 1 wherein the molar ratio of said zirconium to the combination of said cobalt and said vanadium is in the range of about 3:1 to about 1:2.

7. A composition in accordance with claim 1 additionally comprising molybdenum phosphate.

* * * * *